United States Patent [19]
Shor et al.

[11] Patent Number: 6,166,578
[45] Date of Patent: Dec. 26, 2000

[54] CIRCUIT ARRANGEMENT TO COMPENSATE NON-LINEARITIES IN A RESISTOR, AND METHOD

[75] Inventors: Joseph Shor, Raanana; Vladimir Koifman, Rishon le Zion; Yachin Afek, Kfar Saba, all of Israel

[73] Assignee: Motorola Inc., Schaumburg, Ill.

[21] Appl. No.: 09/144,223

[22] Filed: Aug. 31, 1998

[51] Int. Cl.[7] ........................................... H03L 5/00
[52] U.S. Cl. ..................... 327/308; 338/20; 338/325
[58] Field of Search ................................. 327/538, 308; 338/13, 20, 323, 325

[56] References Cited

U.S. PATENT DOCUMENTS

| 5,757,211 | 5/1998 | Phillips | 327/73 |
| 5,783,954 | 7/1998 | Koifman et al. | 327/103 |
| 5,838,192 | 11/1998 | Bowers et al. | 327/540 |
| 5,886,565 | 3/1999 | Yasui et al. | 327/540 |

OTHER PUBLICATIONS

Dieter Sautter, Hans Weinerth (editors): "Lexikon Elektronik und Mikroelektronik", Zweite Auflage (second edition), VDI Verlag, Düsseldorf 1993, pp. 1131–1132, figures a) and b).

Ali†J. Rastegar, Janusz Bryzek: "A High–Performance CMOS Processor for Piezoresistive Sensors", *Sensors*, Oct. 1997, pp. 82–87.

*Primary Examiner*—Jung Ho Kim

[57] ABSTRACT

A circuit arrangement (100) is coupled to a resistor (150) having at least two portions (110, 120). The arrangement (100) provides a substantially linear performance of the resistor (150). The arrangement (100) comprises a differential difference amplifier (160) (with input stages (170, 180) and output stage (190)) and a feedback unit (130). The input stages (170, 180) modify first (161) and second (162) measurement signals (e.g., ($V_B-V_A$) and ($V_A$-GND), respectively) from the resistor portions (110, 120) to intermediate signals (OPH, OMH, OPL, OML). The output stage (190) differentially amplifies sums (at nodes 191, 192) of the intermediate signals and provides a control signal (CONTROL) which corresponds to a magnitude difference between the first and second measurement signals. The feedback unit (130) receives the control signal and supplies a corrective current (I) to the resistor (150) to offset non-linearity.

16 Claims, 5 Drawing Sheets

CIRCUIT ARRANGEMENT TO COMPENSATE NON-LINEARITIES IN A RESISTOR, AND METHOD

FIELD OF THE INVENTION

The present invention generally relates to electronic circuits, and, more particularly, to a circuit arrangement which compensates non-linearities in a resistor. The present invention also relates to a method for operating such an arrangement.

BACKGROUND OF THE INVENTION

For many applications in electronics, integrated resistors are part of a monolithic integrated semiconductor circuit. The resistors are conveniently made in the same process steps as the rest of the integrated circuit. This has, among other things, a cost saving advantage.

Figure 1:
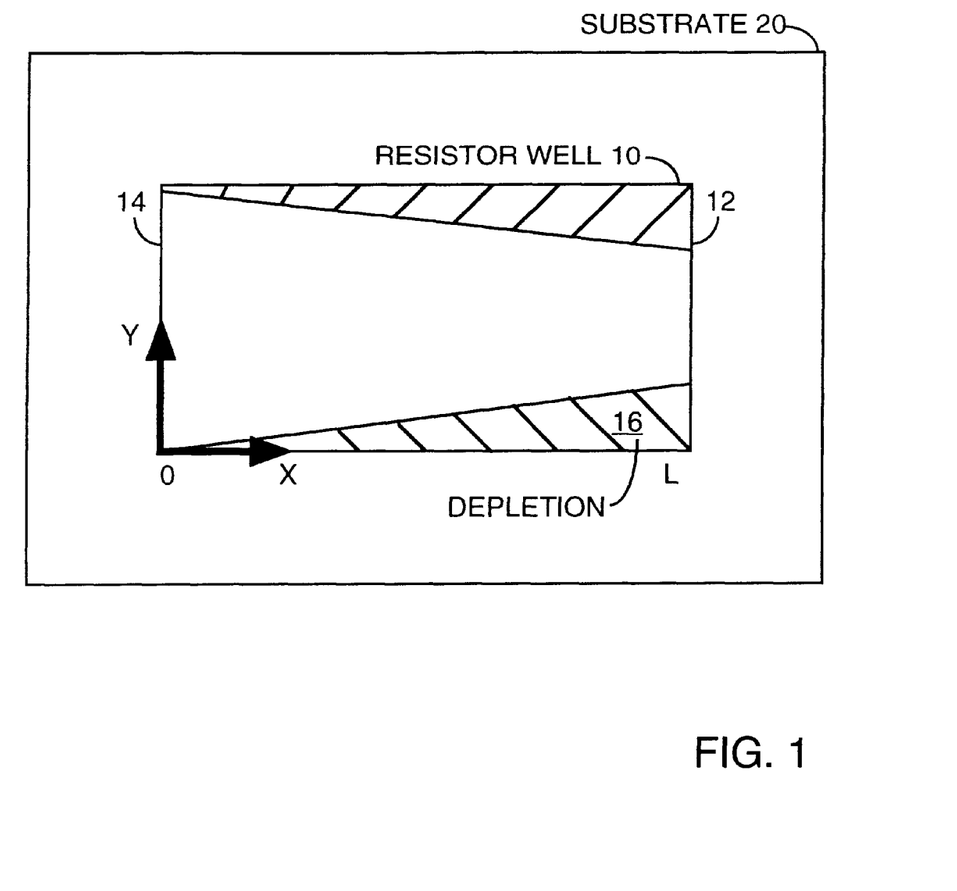
FIG. 1 is a simplified top view of an integrated circuit having an integrated resistor.

FIG. 1 is a simplified top view of an integrated circuit having integrated resistor 10. X and Y-coordinates are provided for convenience. Resistor 10 is formed by a current conducting well (first doping type, e.g., n-well) from X=0 to X=L diffused into substrate 20 (second, opposite doping type, e.g., p-substrate). A voltage is applied between edge 12 at X=L (e.g., positive) and edge 14 at X=0 (e.g., ground potential).

An integrated resistor is also explained by a cross section view (X and Z-coordinates) in [1] Dieter Sautter, Hans Weinerth (editors): "Lexikon Elektronik und Mikroelektronik", Zweite Auflage (second edition), VDI Verlag, Düsseldorf 1993, pages 1131–1132, figures a) and b).

However, a voltage dependent space charge region in substrate 20 limits the current path so that such resistors exhibit an often unwanted non-linearity. In other words, resistor 10 has depletion regions 16 (hatching) whose size depends on the location (e.g., along X-axis) and on the voltage V=f(X). For example, comparing resistance magnitudes at high and low applicable voltages, the resistance magnitudes R=f(X,V) differ by about 2 to 5% or even more.

Nonlinearity can sometimes be accommodated, for example, by calibration of resistors and digital correction by further stages which receive signals from the resistors. But this is limited to cases where a calibration step is possible. A further useful reference for this is: [2] Ali J. Rastegar, Janusz Bryzek: "A High-Performance CMOS Processor for Piezoresistive Sensors", *Sensors,* October 1997, pages 82–87.

For many applications, the non-linearity of an integrated resistor can limit the overall performance of the complete application or can prohibit the use of an integrated resistor. (a) For example, in a sensor, where the integrated resistor transforms a change of a first, non-electrical quantity (e.g., pressure, temperature, mechanical stress, acceleration) into a corresponding change of a second, electrical quantity (e.g., voltage, current signal), the resistor should transfer substantially only the first quantity changes. (b) In another example, in analog-to-digital converters (ADCs, or vice versa: DACs), resistor chains are used as voltage dividers in the analog portion to provide fractions of high (e.g., "rail-to-rail") supply voltages. Since the fractions (e.g., 20% of the supply) are feed back to the converter input, the resistor accuracy is of primary importance.

The present invention seeks to provide solutions which mitigate or avoid these and other disadvantages and limitations of the prior art.

DETAILED DESCRIPTION OF A PREFERRED EMBODIMENT

Figure 2:
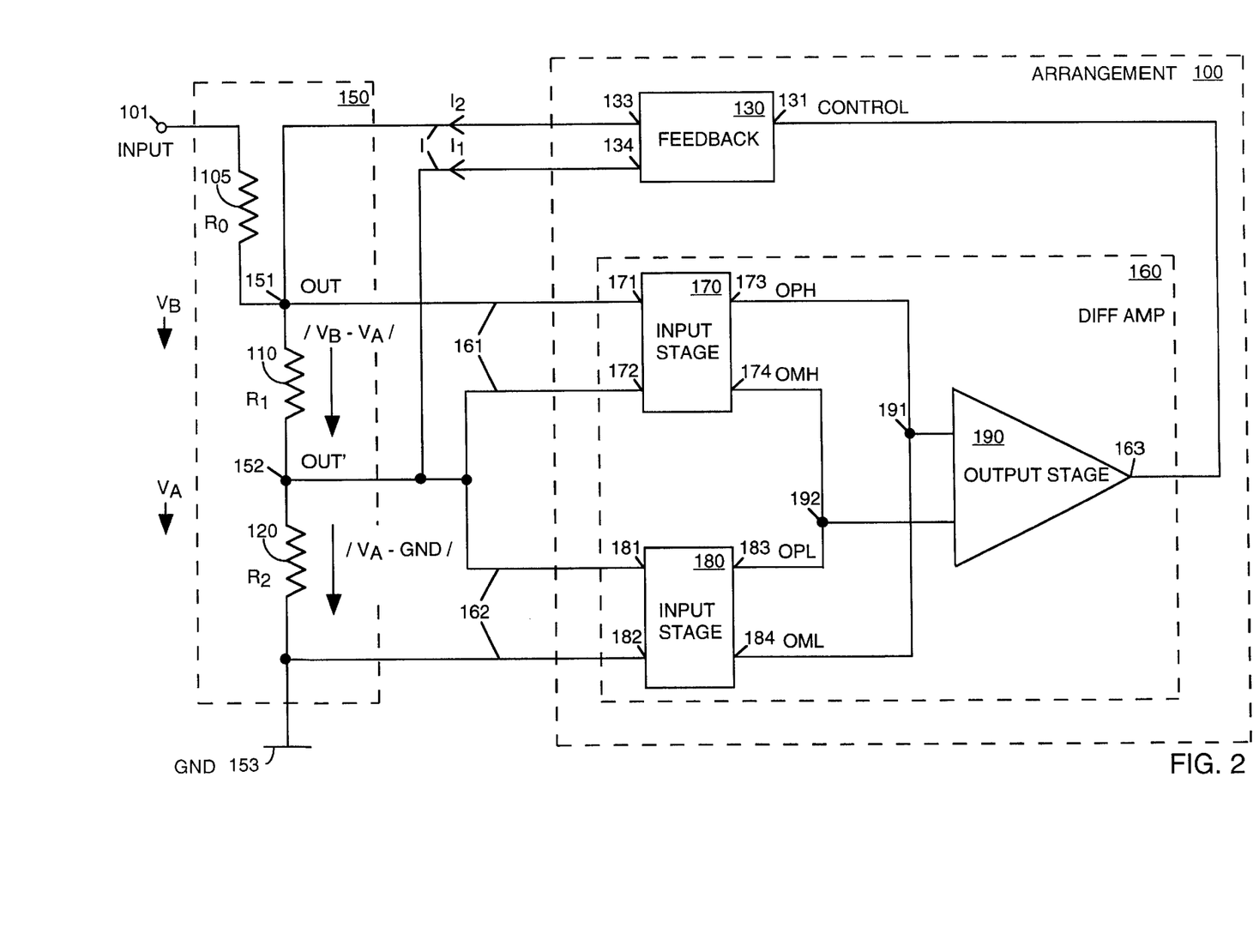
FIG. 2 is a simplified block diagram of a circuit arrangement with differential difference amplifier and feedback unit to linearize a coupled resistor according to the present invention.

FIG. 2 is a simplified block diagram of circuit arrangement 100 (dashed frame) with differential difference amplifier 160 (dashed frame, labeled "DIFF AMP", hereinafter "amplifier") and feedback unit 130 to linearize integrated resistor 150 (dashed frame) according to the present invention. Resistor 150 comprises portions 110 and 120. Further portion 105 is provided optional. In the example of FIG. 2, portions 105, 110 and 120 are serially coupled between input terminal 101 (input signal INPUT) and reference line 153 (e.g., at "ground" GND). Input node 151 between portions 105 and 110 provides a voltage signal $V_A$ (referred to GND), and measurement node 152 between portions 110 and 120 provides a voltage signal $V_B$ (also referred to GND). As used herein, the phrase "linearize a resistor" is intended to include that a voltage or current response across the resistor (or parts of it) substantially linearly depends on an applied signal (e.g., resulting from INPUT).

For example, when resistor 150 is used as voltage divider in a sensor or in a DAC or ADC, an output signal is conveniently obtained at node 151 (OUT), at node 152 (OUT') or at any other part of resistor 150.

Resistance magnitudes $R_0$ of portion 105, $R_1$ of portion 110, and $R_2$ of portion 120, defined at a certain input voltage, are, preferably, related to each other as:

$$R_1 \approx R_2 \qquad (1)$$

$$R_0 = N * (R_1 + R_2) \qquad (2)$$

wherein the * symbol stands for multiplication. Factor N has a useful range between 2 and 20. Convenient values for N are between 3 and 5. In the preferred embodiment, explained below, N is, preferably, a number between 4 and 5. In a preferred embodiment of the present invention, magnitudes are, for example, $R_1 \approx R_2 \approx 10$ kilo ohms and $R_0 \approx 5 * R_1 \approx 100$ kilo ohms.

From outputs 133 and 134, feedback unit 130 provide compensating current signal I to one or more portions of resistor 150. In the simplified diagram of FIG. 2, current signal I has two components $I_2$ (output 133 to node 151) and $I_1$ (output 134 to node 152). Having the current signal illustrated with two components at two feedback outputs is convenient for explanation but not limited thereto. The current signal can also be provided by a single component or by multiple components.

Current I (or its components) partially increase or decrease the current in some portions of resistor 150 without substantially influencing input signal INPUT. Thereby, the resistance magnitudes of some portions are partially changed so that the overall resistance of resistor 150 becomes linear. Current $I_1$ substantially compensates the overall non-linearities of portions 110 and 120 by substantially equalizing the voltage drops across portions 110 and 120. Current $I_2$ substantially compensates the overall non-linearities of portion 105.

Feedback unit 130 is controlled by amplifier 160 through a control signal CONTROL (input 131 of unit 130, output 163 of amplifier 160). Amplifier 160 is a "difference amplifier" amplifying the signal difference between measurement signals 161 and 162 to the (preferably, single-ended) control signal CONTROL. Amplifier 160 is also a "differential amplifier" receiving the signals 161 and 162 as differential signals.

In the example of FIG. 2, signal 161 is the voltage difference $\Delta_1 = V_B - V_A$ between node 151 and 152, respectively, and signal 162 is the voltage difference $\Delta_2 = V_A - GND$ between node 152 and line 153, respectively. Using the same nodes (e.g., 151 and 152) for obtaining measurement signals 161 and 162 and for feeding compensation signals (e.g., $I_2$, $I_1$) is convenient, but not necessary for the present invention. Sharing a common node (e.g., node 152) by signals 161 and 162 is also not essential.

Amplifier 160 conveniently comprises input stages 170 and 180 and output stage 190. For example, stage 170 has input 171 coupled to node 151 and input 172 coupled to node 152; stage 180 has input 181 coupled to node 152 and input 182 coupled to line 153. Stage 170 receiving signal 161 and stage 180 receiving signal 162 are signal converters. Stage 170 provides intermediate signal OPH at output 173 ("O" for "output", P for "plus", "H" for "higher end") coupled to summing node 191 and intermediate signal OMH ("M" for "minus") at output 174 coupled to summing node 192; and stage 180 provides intermediate signal OPL ("L" for "lower end") at output 183 to summing node 192 and intermediate signal OML at output 184 coupled to summing node 191. Output stage 190 with inputs at summing nodes 191 and 192 receives summing signals (OPH+OML) and (OMH+OPL), respectively, and provides CONTROL at output 163. Preferably, output stage 190 is an operational amplifier with a positive input at node 191 and a negative input at node 192.

Persons of skill in the art are able, based on the description herein, to modify resistor 150 and arrangement 100, for example, by adding or removing resistor portions, inputs, and current components, without departing from the scope of the present invention.

Figure 3:
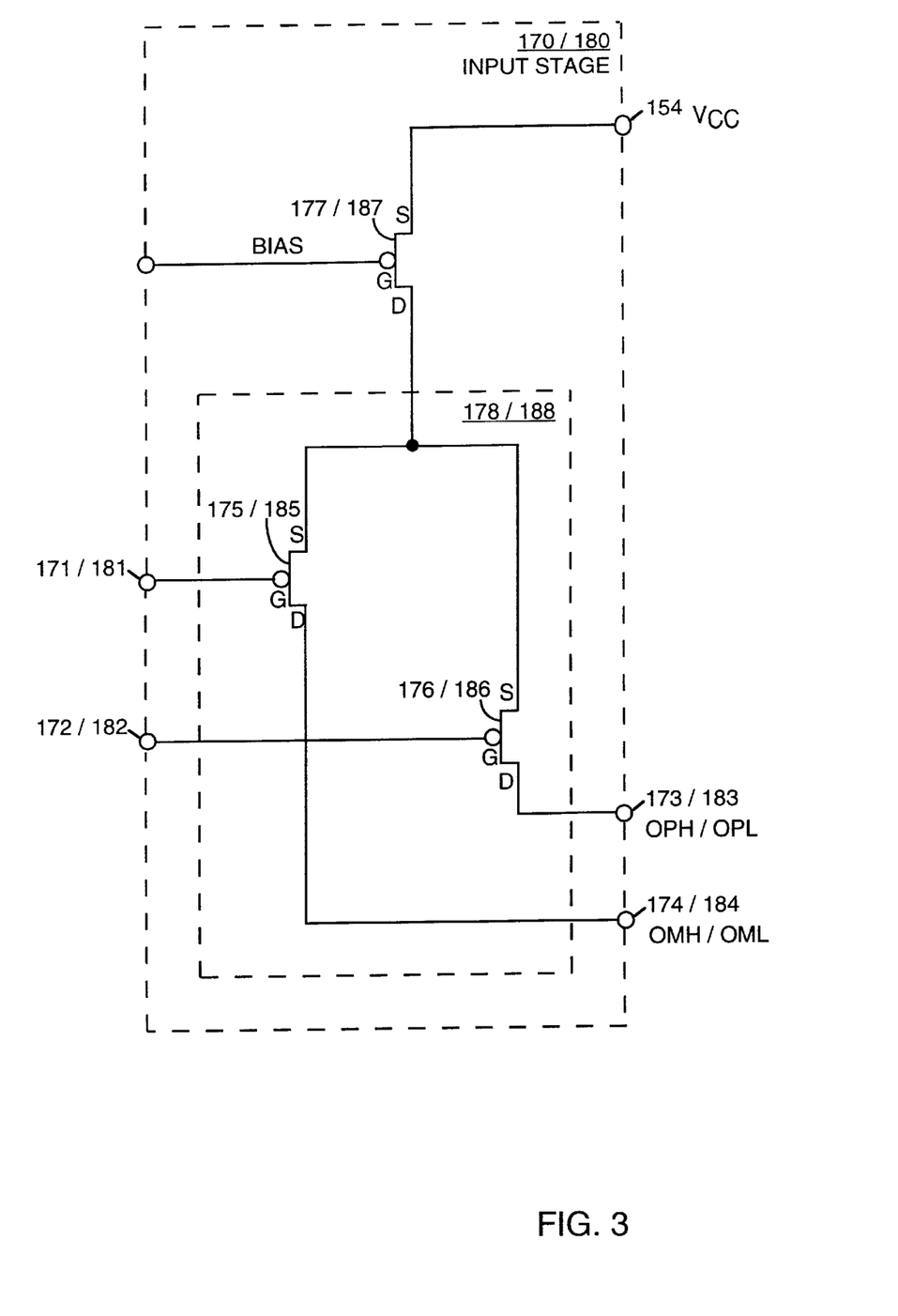
FIG. 3 is a simplified circuit diagram of an input stage as part of the amplifier in FIG. 2, sharing further detail.
Figure 4:
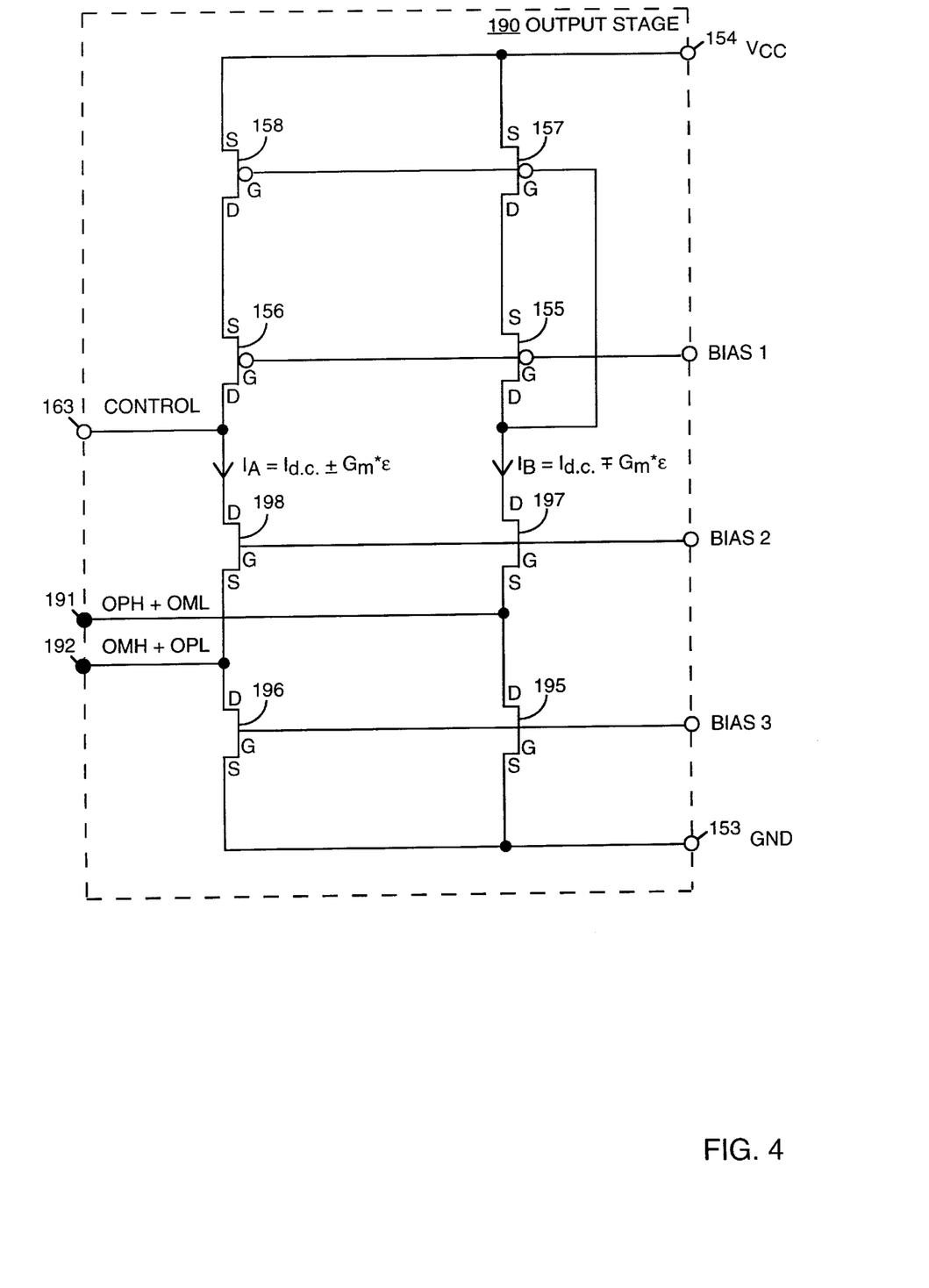
FIG. 4 is a simplified circuit diagram of an output stage as a further part of the amplifier in FIG. 2, sharing further detail.
Figure 5:
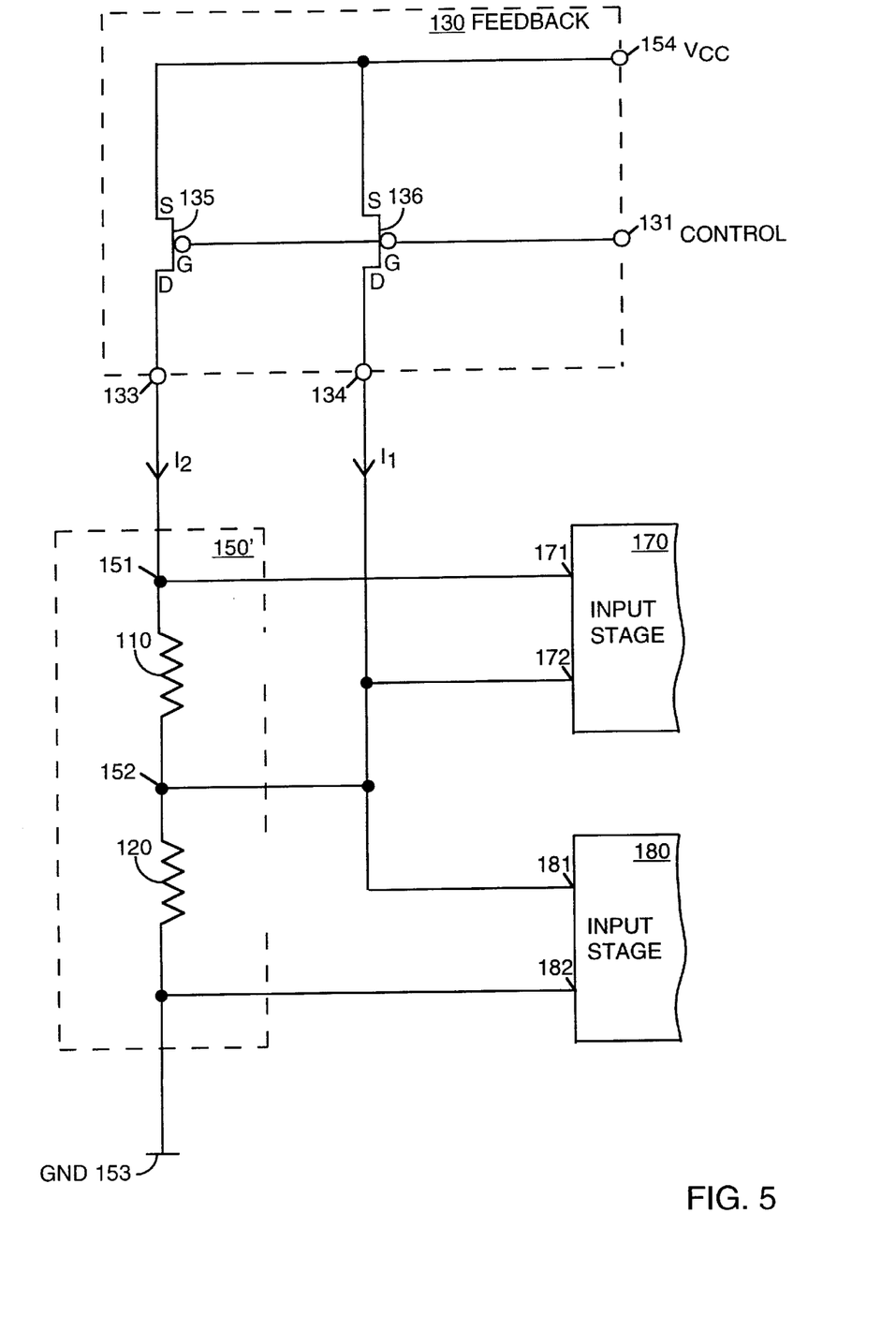
FIG. 5 is a simplified circuit diagram of the feedback unit in FIG. 2 coupled to the resistor, sharing further detail.

The following description in connection with FIGS. 3–5 gives non-limiting examples for a preferred embodiment of the present invention. Persons of skill in the art are able, based on the description herein, to modify the embodiment without departing from the scope of the invention.

The term "transistor" is intended to include any device having at least two main electrodes (e.g., a source S and a drain D) and a control electrode (e.g., a gate G). The impedance between the main electrodes is controlled by a signal applied to the control electrode. The present invention is conveniently explained for CMOS-technology with field effect transistors (FETs) which are either of a p-channel type (P-FET) or of a n-channel type (N-FET). The terms "first type" (e.g., for N-FETs or P-FETs) and "second type" (e.g., for P-FETs or N-FETs) are intended to distinguish complementary transistors of opposite channel conductivity. "First type" and "second type" can refer to either N-FETs or P-FETs, as the case may be. Which electrode is the drain D and which is the source S, depends on the applied voltages, so S and D are distinguished here only for the convenience of explanation. The P-FETs are symbolized by a circle ○ at the transistor gates G. Persons of skill in the art are able, based on the description herein, to use other technologies (e.g., bipolar transistors) without departing from the scope of the invention.

For simplicity, voltages, current or equivalent signals are, unless stated otherwise, assumed to have positive values. Persons of skill in the art who practice the present invention are able, based on the description herein, to use other direction signs (plus, minus) and invert mathematical symbols, (e.g., "+" to "−", ">" to "<"). The above mentioned and following definitions which are convenient for the explanation are therefore not essential for the present invention.

In FIGS. 3–5, stages 170/180, stage 190, and feedback unit 130 ("blocks") are illustrated by dashed frames having inputs (171, 172, 181, 182, 191, 192, 131) and outputs (173, 174, 183, 184, 163, 133, 134) with the same reference numbers as in FIG. 2. References line 154 at potential $V_{CC}$ and reference line 153 at, for example, ground potential GND are illustrated—where applicable—in the same way. Blocks 170, 180 and 190 have inputs to receive gate bias voltages (labeled "BIAS"). Persons of skill in the art can provide such bias voltages without the need of further explanation.

FIG. 3 is a simplified circuit diagram of input stage 170/180 as part of amplifier 160 introduced in FIG. 2. Stages 170 and 180 are implemented similarly and have similar functions. Preferably, stages 170 and 180 are voltage/current converters. The following common description uses terms in singular and reference numbers 170–178 for stage 170 and reference numbers 180–188 for stage 180 (separated by a slash "/"). Stage 170/180 comprises bias transistor 177/187 and differential transistor pair 178/188 (dashed frame) of transistors 175/185 and 176/186. Preferably, transistors 175/185 to 177/187 are P-FETs. Transistor 177/187 has a source S coupled to reference line 154 ($V_{CC}$), a gate G receiving BIAS, and a drain D coupled to the sources of transistors 175/185 and 176/186.

In stage 170, transistor 175 has a gate G at input 171 to receive the first component (e.g., voltage signal $V_B$) of measurement signal 161 (cf. node 151 in FIG. 2) and a drain D at output 174 to provide intermediate signal OMH (also "auxiliary signal"). Transistor 176 has a gate G at input 172 to receive the second component (e.g., voltage $V_A$) of measurement signal 161 (cf. node 152 in FIG. 2) and a drain D at output 173 to provide intermediate signal OPH.

In stage 180, transistor 185 has a gate G at input 181 to receive the first component (e.g., voltage signal $V_A$) of measurement signal 162 (cf. node 152 in FIG. 2) and a drain D at output 184 to provide intermediate signal OML. Transistor 186 has a gate G at input 182 to receive the second component (e.g., voltage GND) of measurement signal 162 (cf. line 153 in FIG. 2) and a drain D to provide intermediate signal OPL at output 183. In the preferred embodiment introduced here, input 171/181 is a positive input and input 172/182 is a negative input of transistor pair 178/188.

Stages 170 and 180 convert differentially received measurement signals 161 and 162 to differential intermediate signals OPH/OPL and OMH/OML, preferably, linearly or by a square function. The transconductances $G_m$ of transistor 175/185 and transistor 176/186 are, preferably, scaled so that the magnitude relation between the summing signals at nodes 191 (outputs 173, 184) and 192 (outputs 174 and 183) substantially corresponds to a magnitude difference between signals 161 and 162. Conveniently, transistor 175/185 and transistor 176/186 have substantial equal $G_m$.

In order to obtain a highly linear signal, stage 170/180 can further comprise compensation transistors. For example, a compensation path can change the supply current of transistor pair 178/188 so that non-linearities of transistors 175/185 and 176/186 are not amplified. Useful examples are given in the following references: [3] United States Patent application entitled "Circuit Compensating Nonlinearities" by Koifman et al., having application Ser. No. 08/925,161, filed on Sep. 8, 1997 now U.S. Pat. No. 5,939,906 which is incorporated herein by reference; and [4] U.S. Pat. No. 5,783,954 by Koifman et al.

For example, as illustrated in FIGS. 1–3 of reference [3], paths 117, 217, 317 correspond to transistor 175/185, and paths 127, 227, 327 correspond to transistor 176/186. Paths 137, 237, 247, 337, 347, 357, and 367 of reference [3] give examples for such optional compensation transistors.

FIG. 4 is a simplified circuit diagram of output stage 190 as a further part of amplifier 160 introduced in FIG. 2. Output stage 190 comprises transistors 155–158 which are, preferably, P-FETs and transistors 195–198 which are, preferably, N-FETs. Between lines 154 ($V_{CC}$) and 153 (GND), transistors 158, 156, 198 and 196 are serially coupled in a first path, and transistors 157, 155, 197 and 195 are serially coupled in a second path. Line 154 is coupled to the source ("S-158") of transistor 158; the drain ("D-158") of transistor 158 is coupled to S-156; D-156 is coupled to D-198; S-198 is coupled to D-196; S-196 is coupled to line 153; line 154 is coupled to S-157; D-157 is coupled to S-155; D-155 is coupled to D-197; S-197 is coupled to D-195; and S-195 is coupled to line 153. Further, the gate ("G-158") of transistor 158 is coupled to G-157 and to D-155; G-156 and G-155 receives BIAS 1; G-198 and G-197 receive BIAS 2; G-196 and G-195 receive BIAS 3. The inputs of stage 190 are node 191 (cf. FIG. 2) at S-197 receiving summing signal (OPH+OML) and node 192 (cf. FIG. 2) at S-198 receiving summing signal (OMH+OPL). Currents $I_A$ between D-156 and D-198 and $I_B$ between D-197 and D-155 have a common direct current (d.c.) part but differ by $2*G_m*\epsilon$. For example, the currents are estimated as:

$$I_A = I_{d.c.} + G_m*\epsilon \quad (3)$$

$$I_B = I_{d.c.} - G_m*\epsilon \quad (4)$$

The difference $I_A - I_B$ is a scaled representation of a magnitude difference $\epsilon$ (see below) between measurement signals 161 and 162 (cf. FIG. 2) and a transistor transconductance $G_m$. Equations (3) and (4) can have further scaling factors neglected here for simplicity of explanation.

Output 163 of stage 190 at D-198 provides control signal CONTROL which is a single-end representation of the differences between the summing signals and is thereby also a folded representation of the magnitude difference of signals 161 and 162.

FIG. 5 is a simplified circuit diagram of feedback unit 130 introduced in FIG. 2 coupled to resistor 150'. FIG. 5 illustrates feedback unit 130 with feedback transistors 135 and 136 (e.g., P-FETs), resistor 150' (similar to resistor 150, but with portion 105 omitted), and inputs 171, 172, 181, 182 of stages 170/180. In feedback unit 130, the sources S of transistors 135 and 136 are coupled to line 154 ($V_{CC}$) and the gates G receive control signal CONTROL from input 131. Current component $I_1$ goes from the drain D of transistor 136 (output 134) to ground line 153 via node 152 and portion 120. Current components $I_2$ goes from the drain D of transistor 135 to ground line 153 via node 151 and portions 110 and 120. Preferably, current components $I_1$ and $I_2$ are linearly scaled (e.g., $I_1*ratio=I_2$). Inputs 171, 172, 181 and 182 are coupled to resistor 150' as described in connection with FIG. 2.

Conveniently, the magnitude ratio between $I_2$ and $I_1$ roughly ($\approx$) corresponds to resistor magnitudes as follows:

$$\frac{I_2}{I_1} \approx \frac{R_0}{R_1 + R_2} \quad (5)$$

Now, it will be described by way of a non-limiting example, how arrangement 100 detects a non-linearity error in resistor 150 and derives the control signal CONTROL. For convenience of explanation, it is convenient to assume that due to the non-linearity (which depends among other on the location), the voltage drop $\Delta_1 = V_B - V_A$ across portion 110 is larger (signal 161) than the voltage drop $\Delta_2 = V_A - GND$ across portion 120 (signal 162), that is:

$$\Delta_1 > \Delta_2 \quad (6)$$

$$V_B - V_A > V_A - GND \quad (7)$$

Keeping the left sides of equations (6) and (7) unchanged, the difference between the voltage drops is expressed on the right side by $\epsilon$, that is:

$$\Delta_1 = \Delta_2 + \epsilon \quad (8)$$

$$V_B - V_A = (V_A - GND) + \epsilon \quad (9)$$

Symbol "$\epsilon$" stands for the non-linearity error. Defining $\epsilon$ as a difference is convenient for explanation. However, the magnitude relation between $\Delta_1$ and $\Delta_2$ can also be expressed, for example, by a factor. When required, persons of skill in the art can also modify the following discussion for factors. Solving equation (8) for $\epsilon$ lead to a rule for measuring $\epsilon$, that is:

$$\epsilon = V_B - 2*V_A + GND \quad (10)$$

Transistors 175, 176, 185 and 186 (see FIG. 3) have substantially equal transconductance values $G_m$. Transistor 176 in input stage 170 provides first intermediate signal OPH as:

$$OPH = G_m * V_B - V_A \quad (11)$$

Transistor 175 in input stage 170 provides second intermediate signal OMH as:

$$OMH = -G_m * V_B - V_A \quad (12)$$

Transistor 186 in input stage 180 provides third intermediate signal OPL as:

$$OPL = G_m * V_A - GND \quad (13)$$

Transistor 185 in input stage 180 provides fourth intermediate signal OML as:

$$OML - G_m * V_A - GND \quad (14)$$

Summing node 191 sums OPH and OML to sum signal (OPH+OML), that is $$OPH + OML = G_m * V_B - 2*V_A + GND \quad (15)$$

$$OPH + OML = G_m * \epsilon \quad (16)$$

Summing node 192 sums OMH and OPL to sum signal (OMH+OPL), that is $$OMH+OPL = -G_m*(V_B - 2*V_A + GND) \quad (17)$$

$$OMH+OPL = -G_m*\epsilon \quad (18)$$

The right sides of equations (16) and (18) correspond to terms in equations (3) and (4). Stage 190 and feedback unit 130 transfer this error representation linearly into the appropriate feedback signal (e.g., current components $I_1$ and $I_2$). The circuitry acts to achieve a balance at summing node 191 and 192, that is:

$$OPH+OML = OPL+OMH \quad (19)$$

This can be achieved when the error $\epsilon$ substantially goes to zero ($\epsilon \rightarrow 0$). Thus, by applying the feedback, non-linearity in resistor 150 is essentially eliminated.

To evaluate the present invention, resistor 150 was simulated as voltage divider (a) with arrangement 100 in the described embodiment of the present invention and (b) in an earlier design without arrangement 100. The simulation method was SPICE, but other methods known in the art could also be used to obtain equivalent results.

During a first simulation, a d.c. input voltage INPUT at terminal 101 was linearly increased from 0 volts to an end value of $V_{CC}$=1.8 volts. In case (a), a measured voltage OUT at node 151 followed linearly from zero to $V_{cc}*(R_1+R_2)/(R_0+R_1+R_2) \approx 300$ milli volts. Non-linearities of the resistor where substantially compensated. In case (b), the voltage OUT exhibited an unwanted deviation of about 6 milli volts (2%) when INPUT reached its end value.

The application of the present invention is not limited to d.c. input signals. In a second simulation, a sinusoidal input signal with (i) a frequency of 1 kilo hertz, (ii) peaks at GND at $V_{CC}$ levels and (iii) an effective current value of about 70 micro amperes was also supplied to input terminal 101. Then, the total harmonic distortion (THD, definitions in reference [3]) was calculated. The THD for the compensation case (a) was more than 20 times lower than for the uncompensated case (b).

Further investigation showed that the useful signal frequency can be higher, such as, for example 20 kilo hertz or more. This is especially important for audio applications.

A method of the present invention can be described as a compensation method with the following steps: (i) Stimulating a first and a second element (e.g., portions 110 and 120) of a resistor (e.g., resistor 150)—wherein at least one element exhibits non-linearity—with a common signal (e.g., INPUT); (ii) Measuring an amount of inequality (e.g., $\epsilon$) between a first response (e.g., signal 161) from the first element and a second response (e.g., signal 162) from the second element; and (iii) Providing additional stimulus (e.g., by current $I_1$ to one element (e.g., portion 120) of the elements depending on the measured amount of inequality (e.g., $\epsilon$) to equalize the responses (e.g., signals 161 and 162).

Having described details, the present invention can also be described as a system (e.g., arrangement 200) with a multi-portion resistor (e.g., resistor 150. The system further comprises:

(a) A differential amplifier 160 which receives (i) a first measurement signal (e.g., signal 161) from a first resistor portion (e.g., from portion 110), (ii) a second measurement signal (e.g., signal 162) from a second resistor portion (e.g., portion 120), and which derives a control signal (e.g., CONTROL) from a magnitude difference (e.g., $\epsilon$) between the measurement signals;

(b) A feedback unit (e.g., unit 130) which receives the control signal and provides a current signal to at least one of the portions (e.g., to portion 110), the control signal corresponding (e.g., CONTROL proportional to $\epsilon$) to the magnitude difference and compensates the difference and substantially linearizes the multi-portion resistor.

Further, the present invention can be described as a circuit (e.g., as illustrated in FIG. 2) with the following features:

(a) Resistor 150 has at least two portions (e.g., portions 110 and 120).

(b) Amplifier 160 has input stages 170 and 180 and output stage 190. Input stage 170 differentially (e.g., $V_B$ and $V_A$) receives a first voltage drop (e.g., from $V_B$ to $V_A$) across a first resistor portion (e.g., portion 110) as measurement signal 161. Input stage 180 differentially (e.g., $V_A$ and GND) receives a second voltage drop (e.g., from $V_A$ to GND) across a second resistor portion (e.g., portion 120) as measurement signal 162. Input stages 170 and 180 forward measurement signals 161 and 162, respectively, as intermediate signals (e.g., OPH, OMH, OPL, OML) to output stage 190. Stage 190 amplifies a difference (e.g., $\epsilon$) between measurement signals 161 and 162.

(c) Feedback unit 130 receives a representation of the difference (cf. currents $I_A$ and $I_B$) between measurement signals 161 and 162 and derives therefrom a correction signal (e.g., current I) for at least one resistor (e.g., to resistor 120) so that the overall current-voltage response (e.g., INPUT to OUT) of resistor 150 is substantially linearized.

Preferably, input stage 170 provides OPH and OMH as intermediate signals and input stage 180 provides OPL and OML as intermediate signals. Output stage 190 balances out first sum (OPH+OML) with second sum (OMH+OPL). The correction signal substantially minimizes a magnitude error ($\epsilon$ going to 0) between measurement signals 161 and 162.

Although the present invention has been described for an integrated resistor, is can be used also for other resistors. Preferably, resistor 150 and arrangement 100 are integrated into a monolithic semiconductor substrate. Resistor 150 and arrangement 100 are conveniently used in input stages of analog circuit. But this is not limited thereto. Further, arrangement 100 can be used for linearizing of other parts of electronic circuits where linearity is critical.

While the invention has been described in terms of particular structures, devices and methods, those of skill in the art will understand based on the description herein that it is not limited merely to such examples and that the full scope of the invention is properly determined by the claims that follow.

What is claimed is:

1. A circuit arrangement coupled to a multi-portion resistor, comprising:

a differential amplifier for receiving a first measurement signal from a first portion of said resistor, receiving a second measurement signal from a second portion of said resistor, and deriving a control signal from a magnitude difference between said first and second measurement signals; and a feedback unit receiving said control signal and providing a current signal to at least one of said portions, said current signal corresponding to said magnitude difference to linearize a response across said resistor by partially changing a resistance magnitude of that at least one of said portions by compensating overall non-linearities in said response across said resistor.

2. The circuit arrangement of claim 1 wherein said current signal has a first component supplied to a node between said first and second portions to substantially equalize said first and second measurement signals.

3. The circuit arrangement of claim 2 wherein said current signal has a second component, said resistor comprises a further portion serially to said first and second portions, said further portion receiving an input signal, and said first and second portions receiving said second component substantially independent from said current signal.

4. The circuit arrangement of claim 3 wherein said first and second components of said current signal are substantially linearly scaled.

5. The circuit arrangement of claim 3 wherein a resistance magnitude of said further portion is 2 to 20 times larger than resistance magnitudes of said first and second portions together.

6. The circuit arrangement of claim 1 wherein said resistor has a further portion to substantially linearly transfer an input signal to an output signal and said current signal is superimposed selectively to said first portion and to said second portion without substantially influencing said input signal.

7. The circuit arrangement of claim 1 wherein said differential amplifier comprises:

a first converter receiving said first measurement signal and providing a differential auxiliary signal;

a second converter receiving said second measurement signal and providing a further differential auxiliary signal, and an output stage differentially receiving said auxiliary signals from said first and second converters and providing said control signal as a single-ended signal.

8. The circuit arrangement of claim 1 wherein said differential amplifier comprises:

a first input stage receiving said first measurement signal differentially and providing first and second intermediate signals;

a second input stage receiving said second measurement signal differentially and providing third and fourth intermediate signals;

an output stage with a first summing node for combining said first and fourth intermediate signals and a second summing node for combining said second and third intermediate signals, said output stage providing said control signal.

9. The circuit arrangement of claim 8 wherein said first and second input stages comprise transistors with substantially linearly scaled transconductances so that a magnitude relation between said first and second summing signals at said first and second summing nodes, respectively, substantially corresponds to said magnitude difference between said first and second measurement signals.

10. The circuit arrangement of claim 9 wherein said transistors have substantially equal transconductances.

11. The circuit arrangement of claim 8 wherein said first and second input stages each comprise first and second pairs of transistors, each pair differentially receiving said first and second measurement signals, said pairs of transistors having transconductances linearized by cross-coupled further transistors.

12. The circuit arrangement of claim 7 wherein said first and second converters each comprise differential pairs of transistors having control electrodes at first and second inputs, wherein the first input of the first converter receives a first voltage signal from a first end of said first portion, and the second input of the first converter and the first input of the second signal converter receives together a second voltage signal from a measurement node at a second end of said first portion and a first end of said second portion, and the second input of the second converter receives a third voltage signal from a second end of said second portion.

13. The circuit arrangement of claim 12 wherein the difference between said first and second voltage signals differentially represents said first measurement signal and the difference between said second and third voltage signals differentially represents said second measurement signal.

14. A compensation method comprising the following steps:

stimulating a first and a second element of a resistor with a common signal, wherein at least one element exhibits non-linearity;

measuring an amount of inequality between a first response from said first element and a second response from said second element; and providing additional stimulus to one elements of said first and second elements depending on the measured amount of inequality to equalize said first and second responses.

15. A circuit comprising:

a resistor having at least two portions;

an amplifier having first and second input stages and an output stage, said first input stage differentially receiving a first voltage drop across a first resistor portion as a first measurement signal, said second input stage differentially receiving a second voltage drop across a second resistor portion as a second measurement signal, said first and second input stages forwarding said first and second measurement signals as intermediate signals to said output stage which amplifies a difference between said first and second measurement signals; and a feedback unit receiving a representation of said difference between said first and second measurement signals and deriving therefrom a correction signal for at least one portion so that the overall current-voltage response of said resistor is substantially linearized.

16. The circuit of claim 15 wherein said first input stage provides first and second intermediate signals, said second input stage provides third and fourth intermediate signals, and said output stage balances out a first sum of said first and fourth intermediate signals with a second sum of said second and third signals, so that said correction signal substantially minimizes a magnitude error between said first and second measurement signals.

* * * * *